(12) United States Patent
Tanaka et al.

(10) Patent No.: US 9,793,768 B2
(45) Date of Patent: Oct. 17, 2017

(54) ROTOR AND ROTARY ELECTRIC MACHINE HAVING THE SAME

(71) Applicant: DENSO CORPORATION, Kariya, Aichi-pref. (JP)

(72) Inventors: Asuka Tanaka, Kariya (JP); Tatsuya Inagaki, Nishio (JP)

(73) Assignee: DENSO CORPORATION, Kariya (JP)

( * ) Notice: Subject to any disclaimer, the term of this patent is extended or adjusted under 35 U.S.C. 154(b) by 334 days.

(21) Appl. No.: 14/450,404

(22) Filed: Aug. 4, 2014

(65) Prior Publication Data
US 2015/0061443 A1 Mar. 5, 2015

(30) Foreign Application Priority Data

Aug. 29, 2013 (JP) .................................. 2013-178304

(51) Int. Cl.
*H02K 1/27* (2006.01)
*H02K 29/03* (2006.01)

(52) U.S. Cl.
CPC ........... *H02K 1/2746* (2013.01); *H02K 1/276* (2013.01); *H02K 1/278* (2013.01); *H02K 29/03* (2013.01); *H02K 2213/03* (2013.01)

(58) Field of Classification Search
CPC ...... H02K 1/2746; H02K 1/276; H02K 1/278; H02K 2213/13; H02K 29/03
USPC ....................... 310/156.01–156.84
See application file for complete search history.

(56) References Cited

U.S. PATENT DOCUMENTS

| | | | | |
|---|---|---|---|---|
| 4,841,186 A | * | 6/1989 | Feigel ................... | H02K 29/08 310/156.12 |
| 2008/0088194 A1 | * | 4/2008 | Jarvinen ................ | H02K 1/276 310/156.23 |
| 2008/0272667 A1 | * | 11/2008 | Ionel ...................... | H02K 1/276 310/156.83 |
| 2010/0013350 A1 | * | 1/2010 | Fu .......................... | H02K 1/28 310/261.1 |

(Continued)

FOREIGN PATENT DOCUMENTS

| JP | 2005-168151 | 6/2005 |
|---|---|---|
| JP | 2006-254662 | 9/2006 |
| JP | 2012-244706 | 12/2012 |

OTHER PUBLICATIONS

Office Action (2 pages) dated Jul. 28, 2015, issued in corresponding Japanese Application No. 2013-178304 and English translation (3 pages).

*Primary Examiner* — Hanh Nguyen
*Assistant Examiner* — Leda Pham
(74) *Attorney, Agent, or Firm* — Nixon & Vanderhye P.C.

(57) ABSTRACT

A rotor has a projection part projected from an inner wall of a central hole part toward a central axis and a rib part defined between opening parts adjacent with each other in a circumferential direction. A first imaginary straight line is defined to extend from the central axis outward in a radial direction through a center of the projection part. The projection part is formed so that the first imaginary straight line passes the opening part. A second imaginary straight line is defined to extend from the central axis outward in the radial direction through a center of the rib part. The rib part is formed so that the second imaginary straight line passes a center of a pole part or an intermediate position between pole parts adjacent with each other in the circumferential direction.

8 Claims, 7 Drawing Sheets

(56) References Cited

U.S. PATENT DOCUMENTS

2012/0222289 A1* 9/2012 Nagai .................... H02K 1/276
  29/598
2012/0326547 A1* 12/2012 Suzuki ................ H02K 1/2746
  310/156.15
2013/0183175 A1* 7/2013 Irie ........................ F04C 2/102
  417/410.4

* cited by examiner

ROTOR AND ROTARY ELECTRIC MACHINE HAVING THE SAME

CROSS REFERENCE TO RELATED APPLICATION

This application is based on Japanese Patent Application No. 2013-178304 filed on Aug. 29, 2013, the disclosure of which is incorporated herein by reference in its entirety.

TECHNICAL FIELD

The present disclosure relates to a rotor and a rotary electric machine having the rotor.

BACKGROUND

JP 2006-254662A describes a rotor in which plural projection parts are formed around a central hole part of a main core. Specifically, the projection parts are projected from the inner wall of the central hole part toward the central axis of the main core. When a shaft of a rotary electric machine is pressingly fitted inside the central hole part, the shaft and the main core are in contact with each other with a contact area. The contact area can be made smaller, due to the projection parts, so the press fitting load of the shaft can be reduced.

In JP 2006-254662A, the rotor has an opening part passing through the main core in the thickness direction. The opening part is located on the outer side of the projection part in the radial direction. Thereby, when the shaft is press-fitted inside the central hole part, the projection part can be displaced outward in the radial direction, and a portion between the projection part and the opening part is deformed. Thus, the press fitting load of the shaft can be further reduced.

SUMMARY

According to an aspect of the present disclosure, a rotor for a rotary electric machine includes a core main part, a central hole part, a projection part, an opening part, a rib part, a pole part, a first annular part, a second annular part, and a magnet. The central hole part is formed to pass through the core main part parallel to the central axis of the core main part. The projection part is arranged in the circumferential direction at equal interval, and is projected toward the central axis from the inner wall of the central hole part.

The opening part is arranged in the circumferential direction of the core main part at equal interval, and passes through the core main part in a direction parallel to the central axis. Thereby, the weight of the core main part can be reduced, and the inertial force can be lowered.

The rib part is formed between the opening parts adjacent with each other in the circumferential direction of the core main part. The number of the rib parts is the same as the number of the opening parts.

The pole part is formed on the outer wall of the core main part in the radial direction and arranged in the circumferential direction of the core main part at equal interval.

The first annular part is annularly formed between the central hole part of and the opening part in the radial direction.

The second annular part is annularly formed between the opening part and the pole part in the radial direction.

The magnet is formed at a position corresponding to the pole part. The magnet is one of a plurality of magnets.

In the present disclosure, since the projection part is formed on the inner wall of the central hole part, the contact area between the shaft and the core main part can be reduced when the shaft is press-fitted inside the central hole part at a time of manufacturing the rotary electric machine. Thus, the press fitting load can be reduced.

Moreover, a first imaginary straight line is defined to extend outward in the radial direction of the core main part from the central axis of the core main part through the center of the projection part in the circumferential direction. The projection part is formed so that the first imaginary straight line intersects the opening part. That is, the opening part is formed on the outer side of the projection part in the radial direction.

When the shaft is press-fitted inside the central hole part so that the outer wall of the shaft is in contact with the tip end of the projection part, the first annular part between the projection part and the opening part is deformed. Therefore, the press fitting load of the shaft can be reduced further. Furthermore, due to the deformation of the first annular part, the outward displacement of the projection part in the radial direction can be restricted from transmitting to the radially outer side of the opening part.

Moreover, a second imaginary straight line is defined to extend outward in the radial direction of the core main part from the central axis of the core main part through the center of the rib part in the circumferential direction. The rib part is formed so that the second imaginary straight line passes the center of the pole part or the intermediate position between the pole parts adjacent with each other in the circumferential direction.

When the shaft is press-fitted inside the central hole part, if the outward displacement of the projection part in the radial direction and the deformation of the first annular part are transmitted via the rib part to the surface to which the magnet is attached, a portion of the surface other than the position corresponding to the center of the magnet can be restricted from being deformed.

Therefore, when the shaft is press-fitted in the core main part after the magnet is attached to the core main part, or when the magnet is attached to the core main part after press-fitting the shaft in the core main part, a surface of the magnet opposing the central axis of the core main part can be restricted from being inclined to the central axis, as to a part of the magnets. Thus, the rotation balance and the magnetic balance of the rotor can be improved. Accordingly, the accuracy of cogging torque and torque ripple can be improved in the rotary electric machine using the rotor.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

Figure 1A:
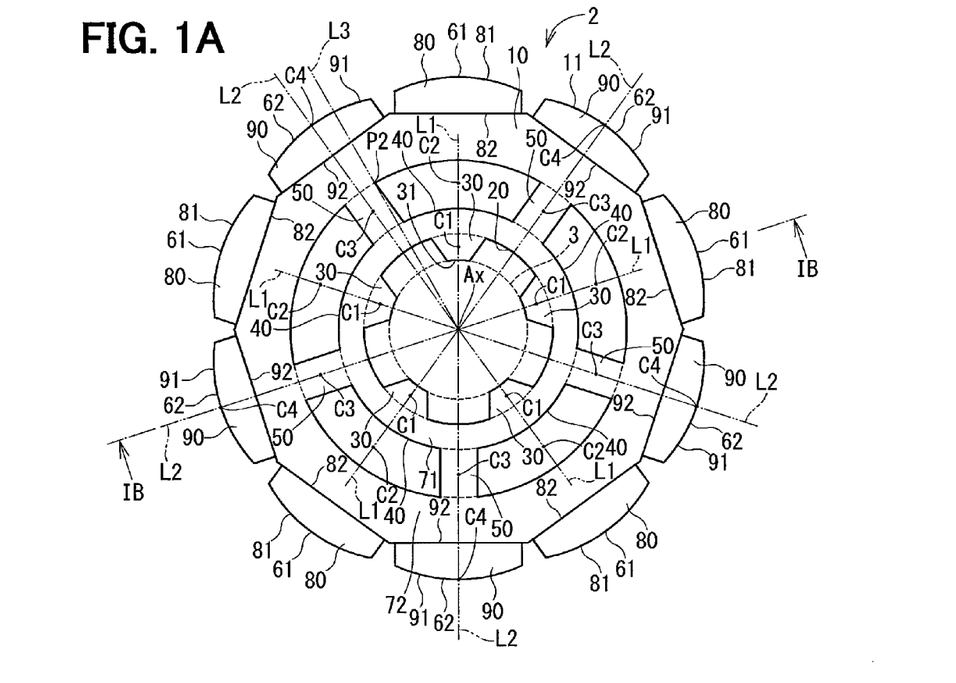
FIG. 1A is a schematic view illustrating a rotor according to a first embodiment.
Figure 1B:
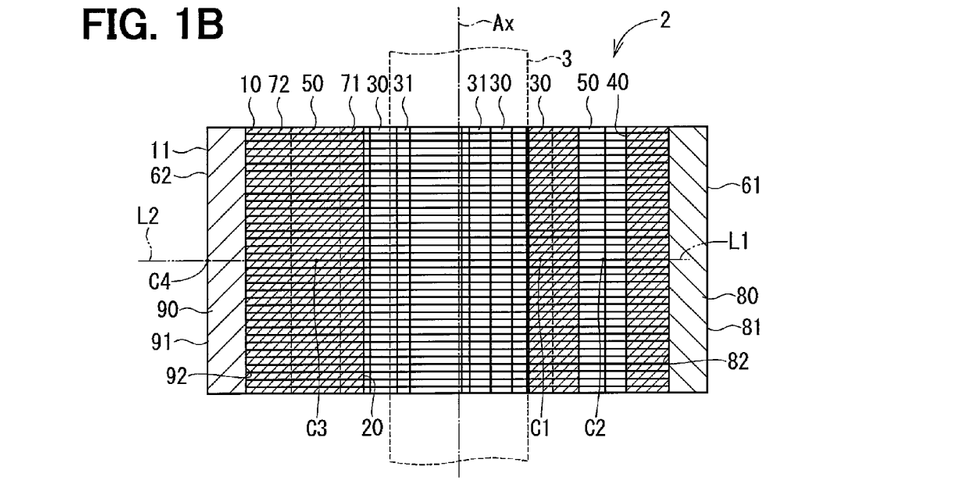
FIG. 1B is a cross-sectional view taken along a line IB-IB in FIG. 1A.
Figure 2:
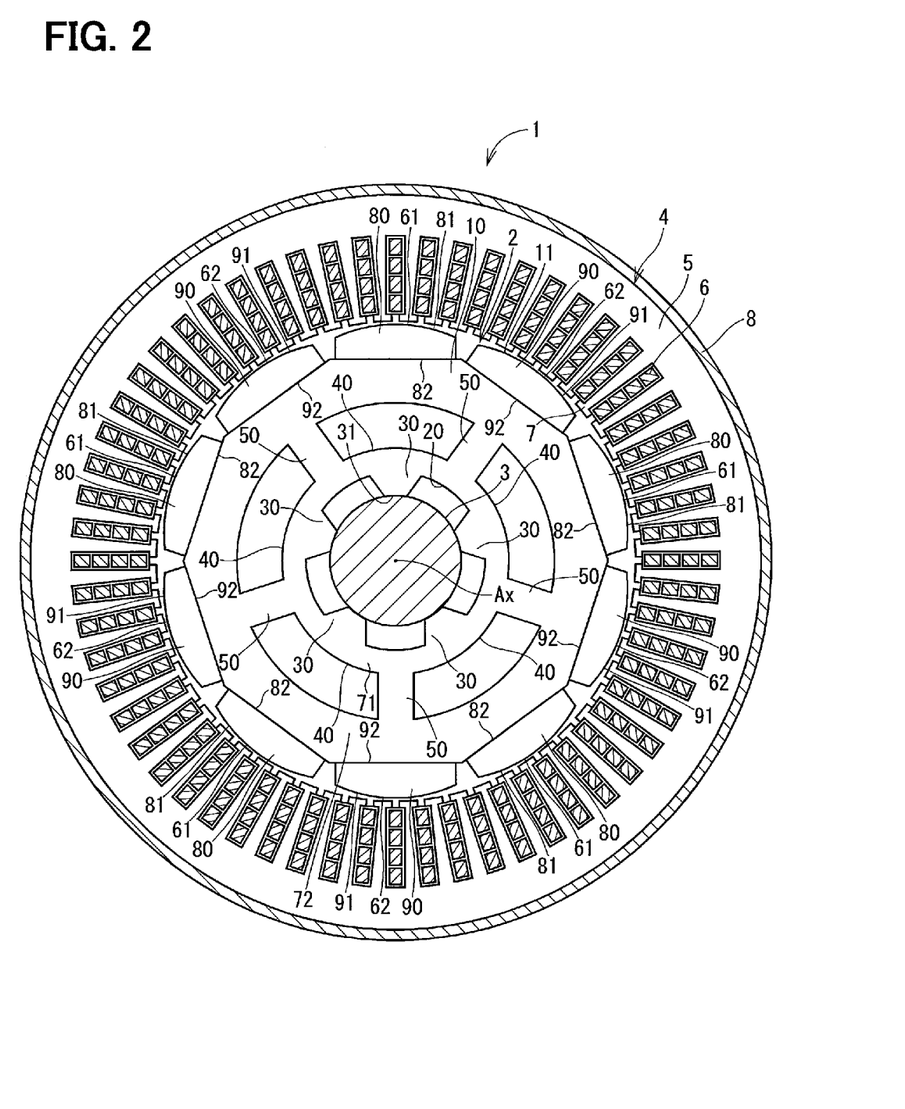
FIG. 2 is a cross-sectional view illustrating a rotary electric machine having the rotor of the first embodiment.

A rotor 2 according to a first embodiment is shown in FIGS. 1A and 1B, and a rotary electric machine 1 having the rotor is shown in FIG. 2.

The rotary electric machine 1 is used, for example, as a drive source (motor) for an electric power-steering equipment which assists steering operation in a vehicle. As shown in FIG. 2, the rotary electric machine 1 includes a shaft 3, a stator 4, a motor case 8 in addition to the rotor 2.

As shown in FIGS. 1A and 1B, the rotor 2 has a core main part 10, a central hole part 20, a projection part 30, an opening part 40, a rib part 50, pole parts 61, 62, a first annular part 71, a second annular parts 72 and magnets 80, 90. The core main part 10 has an approximately pillar shape, for example, by stacking and layering plural thin boards made of metal such as iron. The central hole part 20 is formed to pass through the core main part 10 along a central axis Ax of the core main part 10.

The projection parts 30 are arranged in the circumferential direction of the central hole part 20 at equal interval, and the projection part 30 is formed to be projected toward the central axis Ax from the inner wall of the central hole part 20. The number of the projection parts 30 is five in this embodiment. The projection part 30 has an approximately trapezoid shape in the cross-section defined by an imaginary plane perpendicular to the central axis Ax.

The projection part 30 has a tip part (tip end) 31 opposing the central axis Ax. The tip part 31 defines a wall surface with a curved shape which may be an arc centering at the central axis Ax. The wall surface with the curved shape is formed to correspond to the shape of the outer wall of the shaft 3. A plane wall surface is formed between the tip part 31 and the central hole part 20.

The opening parts 40 are arranged in the circumferential direction of the core main part 10 at equal interval, and the opening part 40 is formed to pass through the core main part 10 in a direction parallel to the central axis Ax. In this embodiment, the number of the opening parts 40 is five, and is formed between the central axis Ax of the core main part 10 and the outer wall 11 of the core main part 10 which is located on the outer side in the radial direction.

The opening part 40 has an approximately sector shape in the cross-section defined by an imaginary plane perpendicular to the central axis Ax. The opening part 40 has an inner wall surface on the inner side in the radial direction and an outer wall surface on the outer side in the radial direction. Each of the inner wall surface and the outer wall surface has a curved shape defined by an arc centering at the central axis Ax of the core main part 10. The opening part 40 has another wall surfaces, each of which connects the inner wall surface to the outer wall surface.

The rib part 50 is formed between the opening parts 40 adjacent with each other in the circumferential direction of the core main part 10. The number of the rib parts 50 is five in this embodiment, similarly to the opening part 40.

The pole part 61 is formed at the outer wall 11 of the core main part 10 on the outer side in the radial direction, and the pole parts 61 are arranged in the circumferential direction of the core main part 10 at equal interval. The pole part 62 is formed between the pole parts 61, also at the outer wall 11 of the core main part 10, and the pole parts 62 are arranged in the circumferential direction of the core main part 10 at equal interval. That is, the pole part 61 and the pole part 62 are alternately arranged at equal interval in the circumferential direction of the core main part 10. In this embodiment, five of the pole parts 61 and five of the pole parts 62 are formed.

The first annular part 71 is annularly formed between the central hole part 20 and the opening part 40. The first annular part 71 has an approximately ring shape.

The second annular part 72 is annularly formed between the opening part 40 and the pole part 61, 62. The second annular part 72 has an approximately ring shape.

The magnet 80 has a long board shape, for example, made of permanent magnet such as neodymium magnet. The length of the magnet 80 in the longitudinal direction is approximately the same as the length of the core main part 10 in the axial direction. The magnet 80 has a first surface 81 with the curved shape and a second surface 82 with the flat shape. The magnet 80 is disposed at a position corresponding to the pole part 61 so that the longitudinal direction of the magnet 80 becomes parallel to the central axis Ax of the core main part 10. The first surface 81 is located on the outer side in the radial direction of the core main part 10 while the second surface 82 opposes the central axis Ax. Five of the magnets 80 are arranged in the circumferential direction of the core main part 10 at equal interval.

The magnet 90 has the same shape as the magnet 80 and is made of permanent magnet such as neodymium magnet, similarly to the magnet 80. The magnet 90 is disposed at a position corresponding to the pole part 62 so that the longitudinal direction of the magnet 90 becomes parallel to the central axis Ax of the core main part 10. The first surface 91 of the magnet 90 is located on the outer side in the radial direction of the core main part 10 and the second surface 92 of the magnet 90 opposes the central axis Ax.

The magnet 80, 90 is attached to the attachment surface of the core main part 10 so that a straight line perpendicular to the second surface 82, 92 and passing through the center of the magnet 80, 90 crosses the central axis Ax.

In this embodiment, the magnet 80 is arranged so that a part of the first surface 81, i.e., outer wall, is exposed to outside at the pole part 61. The magnet 90 is arranged so that a part of the first surface 91, i.e., outer wall, is exposed to outside at the pole part 62. That is, the first surface 81, 91 of the magnet 80, 90 is exposed from the outer wall 11 of the core main part 10. In this embodiment, the magnet 80, 90 is bonded to the attachment surface of the core main part 10, for example, by adhesive. The rotor 2 of this embodiment is used for the rotary electric machine 1 which is a surface permanent magnet (SPM) type machine.

In this embodiment, the magnet 80 is magnetized so that the first surface 81 becomes N pole and that the second surface 82 becomes S pole. The magnet 90 is magnetized so that the first surface 91 becomes S pole and that the second surface 92 becomes N pole. Thereby, the magnetic pole is formed so that the N pole (pole part 61) and the S pole (pole part 62) are alternately defined in the circumferential direction of the core main part 10.

In this embodiment, the total number of the magnet 80 and the magnet 90 is ten which is equal to the total number of the pole part 61 and the pole part 62. That is, the rotor 2 of this embodiment is used for the full magnet type rotary electric machine 1.

As shown in FIG. 1A, a first imaginary straight line L1 is defined to extend from the central axis Ax of the core main part 10 outward in the radial direction of the core main part 10 through the center C1 of the projection part 30. The projection part 30 is formed so that the first imaginary straight line L1 passes through the opening part 40. In detail, the projection part 30 is formed so that the first imaginary straight line L1 passes through the center C2 of the opening part 40.

Moreover, a second imaginary straight line L2 is defined to extend from the central axis Ax of the core main part 10 outward in the radial direction of the core main part 10 through the center C3 of the rib part 50. The rib part 50 is formed so that the second imaginary straight line L2 passes through the center C4 of the pole part 62.

In addition, the rib part 50, and the second annular part 72 are in contact with each other at a point P2 which is the corner of the opening part 40. A third imaginary straight line L3 is defined to extend from the central axis Ax of the core main part 10 outward in the radial direction of the core main part 10 through the point P2. The rib part 50 is formed so that the third imaginary straight line L3 passes through the magnet 90.

As shown in FIG. 2, the stator 4 has a core main part 5 and a winding wire 6. The core main part 5 has an approximately ring shape, for example, by stacking and layering plural thin boards made of metal such as iron. The core main part 5 has teeth 7 extending inward in the radial direction. In this embodiment, the number of the teeth 7 is sixty, and the teeth 7 are arranged in the circumferential direction of the core main part 5 at regular interval. The winding wire 6 is, for example, made of metal such as copper, and is wound between the teeth 7 in the core main part 5. The winding wire 6 defines plural phases in the rotary electric machine 1.

The shaft 3 is made of metal, and has an approximately column shape. The shaft 3 is press-fitted inside the central hole part 20 of the core main part 10 of the rotor 2 so that the outer wall of the shaft 3 is in contact with the tip part 31 of the projection part 30. Thereby, the shaft 3 can rotate with the rotor 2.

The motor case 8 is made of metal, and has an approximately cylindrical shape. Each end of the motor case 8 is closed by an end frame (not shown). The rotor 2 and the stator 4 are arranged in the motor case 8. The stator 4 is fixed in the motor case 8 such that the radially outer wall of the core main part 5 is in contact with the inner wall of the motor case 8.

The axial end of the shaft 3 is supported by the end frame. Thereby, the rotor 2 is rotatable on the inner side of the stator 4 inside the motor case 8.

When electric power is supplied to the winding wire 6 of the stator 4, a rotating magnetic field is generated in the stator 4. Thereby, the rotor 2 rotates with the shaft 3. As a result, rotation of the rotary electric machine 1 is outputted from the shaft 3.

According to the first embodiment, the central hole part 20 is formed to pass through the core main part 10 along the central axis Ax of the core main part 10. The projection parts 30 are arranged in the circumferential direction of the central hole part 20 at equal interval, and the projection part 30 is projected toward the central axis Ax from the inner wall of the central hole part 20. The opening parts 40 are arranged in the circumferential direction of the core main part 10 at equal interval, and the opening part 40 passes through the core main part 10 in the direction parallel to the central axis Ax. Thereby, the weight and the inertia of the core main part 10 can be decreased.

The rib part 50 is formed between the opening parts 40 adjacent with each other in the circumferential direction of the core main part 10. The number of the rib parts 50 is the same as the number of the opening parts 40. The pole part 61 and the pole part 62 are alternately arranged in the circumferential direction of the core main part 10 at equal interval, on the radially outer wall 11 of the core main part 10.

The first annular part 71 is annularly formed between the central hole part 20 of the core main part 10 and the opening part 40. The second annular part 72 is annularly formed between the opening part 40 and the pole part 61, 62. The magnet 80 is formed at the position corresponding to the pole part 61 of the core main part 10, and the number of the magnets 80 is five. The magnet 90 is formed at the position corresponding to the pole part 62 of the core main part 10, and the number of the magnets 90 is five.

In this embodiment, five of the projection parts 30 are formed on the inner wall of the central hole part 20. The contact area between the shaft 3 and the core main part 10 can be made small, due to the projection parts 30, when the rotary electric machine 1 is manufactured by press-fitting the shaft 3 inside the central hole part 20. Thus, the press-fitting load of the shaft 3 can be reduced.

In this embodiment, the projection part 30 is formed so that the first imaginary straight line L1 extending from the central axis Ax via the center C1 of the projection part 30 passes through the opening part 40. That is, the opening part 40 is formed on the outer side of the projection part 30 in the radial direction.

Therefore, when the shaft 3 is press-fitted inside the central hole part 20 so that the outer wall of the shaft 3 is in contact with the tip part 31 of the projection part 30, the first annular part 71 between the projection part 30 and the opening part 40 is deformed. Thereby, the press-fitting load of the shaft 3 can be reduced further. Moreover, the displacement of the projection part 30 outward in the radial direction can be restricted from transmitting to the radially outer side of the opening part 40, due to the deformation of the first annular part 71.

In this embodiment, since the magnet 80 is disposed on the outer side of the opening part 40 in the radial direction, the displacement of the projection part 30 outward in the radial direction can be restricted from transmitting to the attachment surface of the core main part 10 to which the magnet 80 is attached.

In a comparison example, a rotor has a rib part formed between opening parts adjacent to each other in the circumferential direction of a core main part, and a magnet is formed on the outer side of the rib part in the radial direction. A part of the rib parts is formed so that an imaginary straight line extending from the central axis through the center of the rib part passes places other than the center of the magnet, i.e., the pole part.

In the comparison example, when the shaft is press-fitted inside the central hole part, the radially-outward displacement of the projection part and the deformation of the core main part are transmitted to the attachment surface to which the magnet is attached via the rib part. In this case, the attachment surface may be deformed at positions other than a position corresponding to the center of the magnet.

When the shaft is press-fitted in the core main part after the magnet is attached to the core main part, or when the magnet is attached to the core main part after press-fitting the shaft in the core main part, the surface of a part of the magnets opposing the central axis may be inclined relative to the central axis. In this case, the rotation balance and the magnetic balance of the rotor are deteriorated, and the accuracy of cogging torque and torque ripple is lowered in the rotary electric machine using the rotor.

In contrast, according to the present disclosure, the rotation balance and the magnetic balance of the rotor 2 can be improved, while the press fitting load of the shaft 3 relative to the core main part 10 is reduced. The rotor 2 can be applied to the rotary electric machine 1.

Moreover, the rib part 50 is formed so that the second imaginary straight line L2 extending from the central axis Ax via the center C3 of the rib part 50 passes through the center C4 of the pole part 62, i.e., the center of the magnet 90. Therefore, when the shaft 3 is press-fitted inside the central hole part 20, if the radially-outward-displacement of the projection part 30 and the deformation of the first annular part 71 are transmitted to the attachment surface of the magnet 90 via the rib part 50, a portion of the attachment surface other than the position corresponding to the center of the magnet 90 can be restricted from having a deformation.

Therefore, when the shaft 3 is press-fitted in the core main part 10 after the magnet 90 is attached to the core main part 10, or when the magnet 90 is attached to the core main part 10 after press-fitting the shaft 3 in the core main part 10, the second surface 92 of the magnet 90 opposing the central axis Ax can be restricted from being inclined relative to the central axis Ax, of a part of the magnets 90. Thereby, the rotation balance and the magnetic balance of the rotor 2 can be improved. Therefore, the accuracy of cogging torque and torque ripple can be improved in the rotary electric machine 1 using the rotor 2.

Moreover, the projection part 30 is formed so that the first imaginary straight line L1 passes through the center C2 of the opening part 40. Therefore, when the shaft 3 is press-fitted inside the central hole part 20, the press fitting load of the shaft 3 can be more effectively reduced, and the displacement of the projection part 30 outward in the radial direction can be restricted from transmitting to the radially outer side of the opening part 40 more effectively.

Moreover, the rib part 50 is formed so that the second imaginary straight line L2 passes through the center of the magnet 90. Therefore, when the shaft 3 is press-fitted inside the central hole part 20, the displacement of the projection part 30 outward in the radial direction and the deformation of the first annular part 71 can be more effectively restricted from transmitting to the attachment surface of the magnet 80 via the rib part 50.

The total number of the magnets 80 and the magnets 90 is the same as the total number of the pole parts 61 and the pole parts 62.

In this embodiment, the magnet 80, 90 is formed so that a part of the outer wall of the magnet 80, 90 is exposed to outside at the pole part 61, 62. That is, the rotor 2 is used for the SPM type rotary electric machine 1.

(Second Embodiment)

Figure 3:
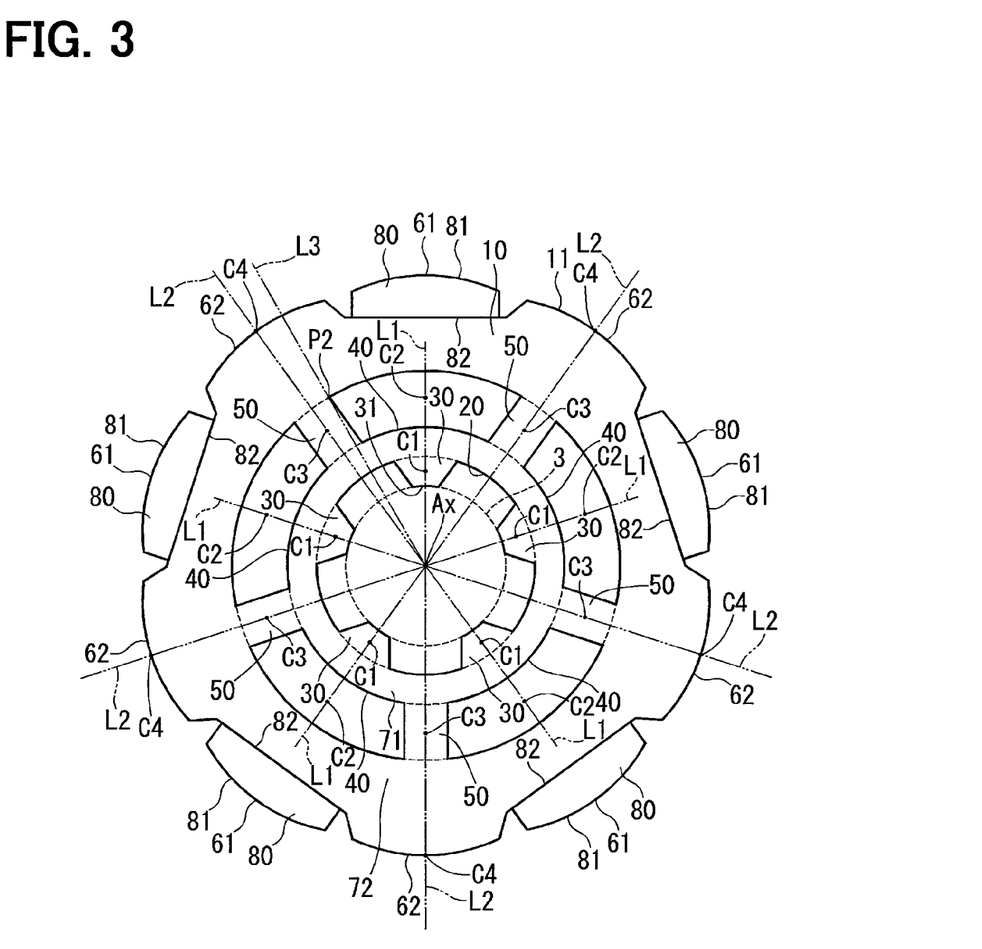
FIG. 3 is a schematic view illustrating a rotor according to a second embodiment.

A rotor according to a second embodiment is shown in FIG. 3. The number of the magnets is different in the second embodiment from the first embodiment.

In the second embodiment, the rotor has only the magnet 80, in other words, the rotor does not have the magnet 90 of the first embodiment. Therefore, a magnetic pole is formed in the pole part 61, and a false pole is formed in the pole part 62 when the magnetic flux passes from the magnet 80. The number of the magnets 80 is five, that is a half of the total number of the pole part 61 and the pole part 62, i.e., ten. That is, the rotor of this embodiment is a rotor used for a half magnet type rotary electric machine. Therefore, the number of components (the number of the magnets) can be reduced.

Moreover, in this embodiment, the rib part 50 is formed so that the second imaginary straight line L2 passes through the center C4 of the pole part 62 and the intermediate position between the magnets 80 adjacent with each other in the circumferential direction of the core main part 10. Therefore, when the shaft 3 is press-fitted inside the central hole part 20, if the projection part 30 is displaced outward in the radial direction and if the first annular part 71 is deformed, the displacement and the deformation can be effectively restricted from transmitting to the attachment surface for the magnet 80 via the rib part 50.

The third imaginary straight line L3 is defined to extend from the central axis Ax via the point P2 where the opening part 40, the rib part 50, and the second annular part 72 are in contact with each other. The rib part 50 is formed so that the third imaginary straight line L3 passes through an area between the magnets 80 adjacent with each other in the circumferential direction of the core main part 10. That is, the magnets 80 are arranged in the circumferential direction of the core main part 10 at positions not overlapping with the rib part 50 in the radial direction. Therefore, the deformation of the first annular part 71 generated when the shaft 3 is press-fitted inside the central hole part 20 is much more effectively restricted from transmitting to the attachment surface for the magnet 80 via the rib part 50.

The number of the magnets 80 is five which is the same as the number of the projection parts 30 and the number of the opening parts 40. Therefore, the rotation balance and the magnetic balance can be improved.

The opening part 40 is formed on the inner side of the magnet 80 in the radial direction of the core main part 10. Therefore, the magnetic flux can easily flow between the pole part 62 (false pole) and the second surface 82 of the magnet 80.

(Third Embodiment)

Figure 4:
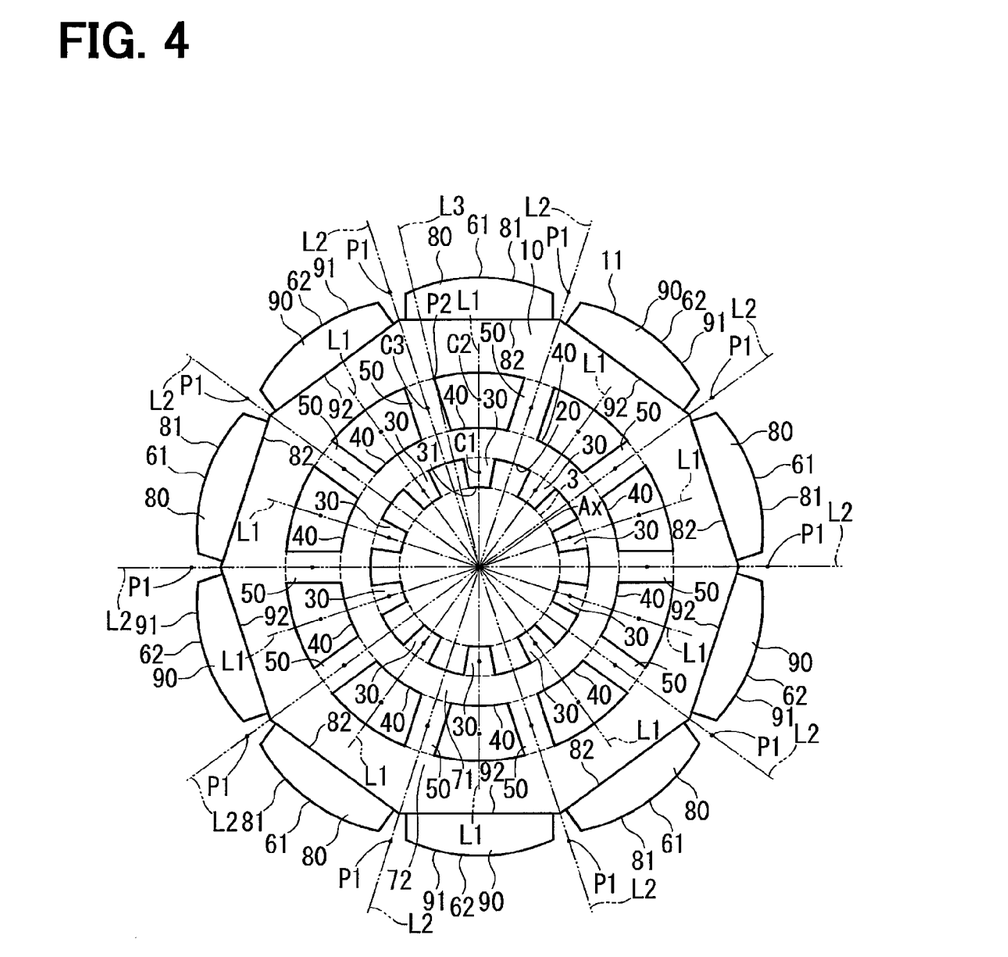
FIG. 4 is a schematic view illustrating a rotor according to a third embodiment.

A rotor according to a third embodiment is shown in FIG. 4. The third embodiment differs in the number of the projection parts, the opening parts, and the rib parts from the first embodiment.

In the third embodiment, ten of the projection parts 30 are arranged in the circumferential direction of the central hole part 20 at equal interval. The projection part 30 is formed to project toward the central axis Ax from the inner wall of the central hole part 20.

Ten of the opening parts 40 are arranged in the circumferential direction of the core main part 10 at equal interval. The opening part 40 is formed to pass through the core main part 10 in the direction parallel to the central axis Ax.

The rib part 50 is formed between the opening parts 40 adjacent to each other in the circumferential direction of the core main part 10. The number of the rib parts 50 is ten, which is the same as the number of the opening parts 40.

As shown in FIG. 4, the projection part 30 is formed so that the first imaginary straight line L1 extending from the central axis Ax via the center C1 of the projection part 30 passes through the opening part 40. In detail, the projection part 30 is formed so that the first imaginary straight line L1 passes through the center C2 of the opening part 40.

The rib part 50 is formed so that the second imaginary straight line L2 extending from the central axis Ax via the center C3 of the rib part 50 passes through the intermediate position P1 between the pole part 61 and the pole part 62 adjacent with each other in the circumferential direction of the core main part 10 and the intermediate position between the magnet 80 and the magnet 90.

The rib part 50 is formed so that the third imaginary straight line L3 extending from the central axis Ax via the point P2 at which the opening part 40, the rib part 50, and the second annular part 72 are in contact with each other passes through the magnet 80.

As explained above, in this embodiment, the projection part 30 is formed so that the first imaginary straight line L1 passes through the opening part 40. Therefore, similarly to the first embodiment, the press fitting load of the shaft 3 can be reduced, and the radially outward displacement of the projection part 30 is restricted from transmitting to the radially outer side of the opening part 40.

Moreover, the rib part 50 is formed so that the second imaginary straight line L2 passes through the intermediate position P1 between the pole part 61 and the pole part 62 adjacent with each other in the circumferential direction of the core main part 10. Therefore, if the radially outward displacement of the projection part 30 and the deformation of the first annular part 71 which are generated when the shaft 3 is press-fitted inside the central hole part 20 are transmitted to the attachment surface for the magnets 80 and 90 via the rib part 50, the attachment surface can be restricted from being deformed at positions other than the position corresponding to the center of the magnet 80, 90.

Therefore, when the shaft 3 is press-fitted in the core main part 10 after the magnets 80 and 90 are attached to the core main part 10, or when the magnets 80 and 90 are attached to the core main part 10 after press-fitting the shaft 3 in the core main part 10, as to a part of the magnets 80 and 90, the second surface 82, 92 opposing the central axis Ax of the core main part 10 is restricted from being inclined to the central axis Ax. Thus, the accuracy of cogging torque and torque ripple can be improved in the rotary electric machine using the rotor of this embodiment.

Moreover, in this embodiment, the projection part 30 is formed so that the first imaginary straight line L1 passes through the center C2 of the opening part 40. Therefore, when the shaft 3 is press-fitted inside the central hole part 20, the press fitting load of the shaft 3 can be more effectively reduced, and the radially outward displacement of the projection part 30 is more effectively restricted from transmitting to the radially outer portion of the opening part 40.

Moreover, in this embodiment, the rib part 50 is formed so that the second imaginary straight line L2 passes through the intermediate position between the magnet 80 and the magnet 90 in the circumferential direction of the core main part 10. Therefore, the radially outward displacement of the projection part 30 and the deformation of the first annular part 71 are more effectively restricted from transmitting to the attachment surface for the magnets 80 and 90 via the rib part 50.

(Fourth Embodiment)

Figure 5:
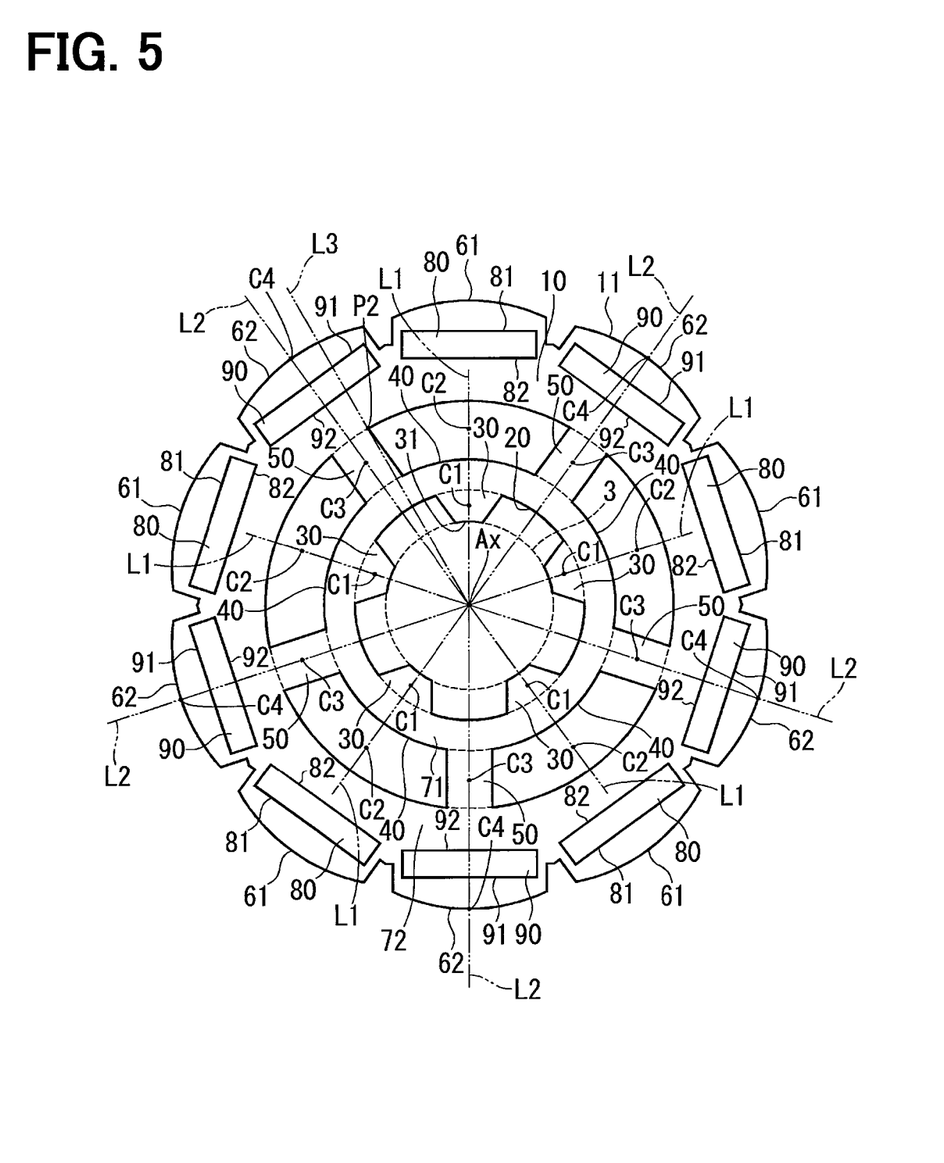
FIG. 5 is a schematic view illustrating a rotor according to a fourth embodiment.

A rotor according to a fourth embodiment is shown in FIG. 5. The fourth embodiment differs in the shape and the arrangement of the magnets from the first embodiment.

In the fourth embodiment, the first surface 81 and the second surface 82 of the magnet 80 are formed plane and flat. The volume of the magnet 80 is smaller in the fourth embodiment, compared with the first embodiment. The magnet 80 is formed to be located inside the pole part 61.

The first surface 91 and the second surface 92 of the magnet 90 are formed plane and flat. The volume of the magnet 90 is smaller in the fourth embodiment, compared with the first embodiment. The magnet 90 is formed to be located inside the pole part 62.

That is, the magnets 80 and 90 are formed on the radially inner side of the outer wall 11 which is the radially outer end of the core main part 10. In other words, the magnets 80 and 90 are embedded interior of the core main part 10. Thus, the rotor of this embodiment is a rotor used for an interior permanent magnet (IPM) rotary electric machine.

The other configuration in this embodiment is the same as that of the first embodiment. Therefore, in this embodiment, similarly to the first embodiment, even when the radially outward displacement of the projection part 30 and the deformation of the first annular part 71 are transmitted to the attachment surface for the magnet 90 via the rib part 50, the attachment surface can be restricted from being deformed at positions other than the position corresponding to the center of the magnet 90.

Therefore, when the shaft 3 is press-fitted in the core main part 10 after the magnet 90 is attached to the core main part 10, or when the magnet 90 is attached to the core main part 10 after press-fitting the shaft 3 in the core main part 10, as to a part of the magnets 90, the second surface 92 opposing the central axis Ax of the core main part 10 is restricted from being inclined to the central axis Ax.

Moreover, since the magnets 80 and 90 are disposed inside of the core main part 10, the mechanical strength is high. The magnets 80 and 90 are prevented from slipping off from the core main part 10, so the rotor of this embodiment is suitably used for high velocity rotation. Moreover, compared with the SPM type machine shown in the first embodiment, the amount (volume) of the magnets can be reduced and the cost can be reduced.

(Fifth Embodiment)

Figure 6:
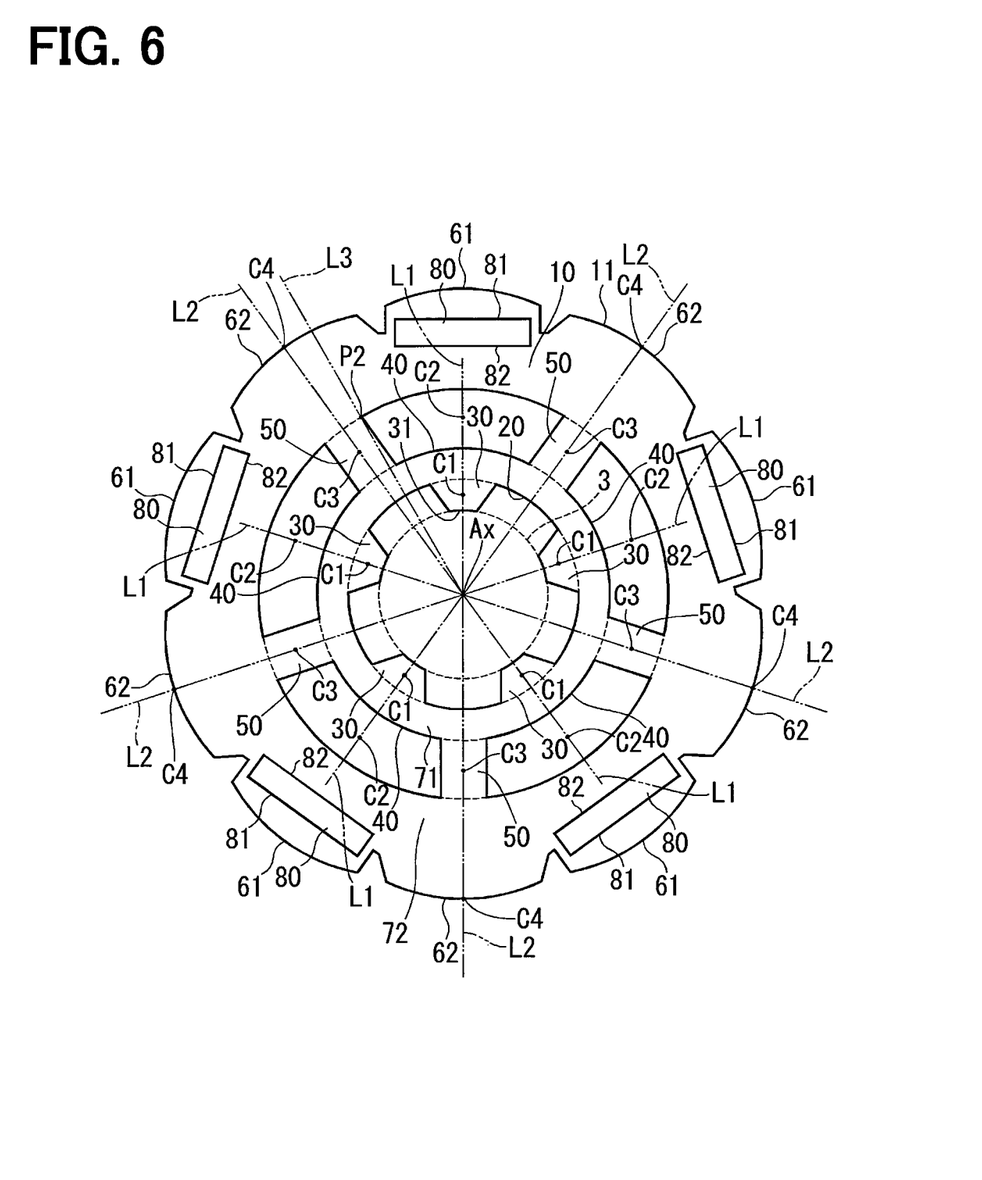
FIG. 6 is a schematic view illustrating a rotor according to a fifth embodiment.

A rotor according to a fifth embodiment is shown in FIG. 6. The fifth embodiment differs in the shape and the arrangement of the magnets from the second embodiment.

In the fifth embodiment, the first surface 81 and the second surface 82 of the magnet 80 are formed plane and flat. The volume of the magnet 80 is smaller in the fifth embodiment, compared with the second embodiment. The magnet 80 is formed to be located inside the pole part 61.

That is, the magnet 80 is formed on the radially inner side of the outer wall 11 which is the radially outer end of the core main part 10. In other words, the magnet 80 is embedded interior of the core main part 10. Thus, the rotor of this embodiment is a rotor used for an interior permanent magnet (IPM) rotary electric machine.

The other configuration in this embodiment is the same as that of the second embodiment. Therefore, the similar advantages can be achieved in this embodiment as the second embodiment.

Moreover, since the magnet 80 is embedded inside of the core main part 10, the mechanical strength is high. The magnet 80 is prevented from slipping off from the core main part 10, so the rotor of this embodiment is suitably used for high velocity rotation. Moreover, compared with the SPM type machine shown in the second embodiment, the amount (volume) of the magnets can be reduced and the cost can be reduced.

(Sixth Embodiment)

Figure 7:
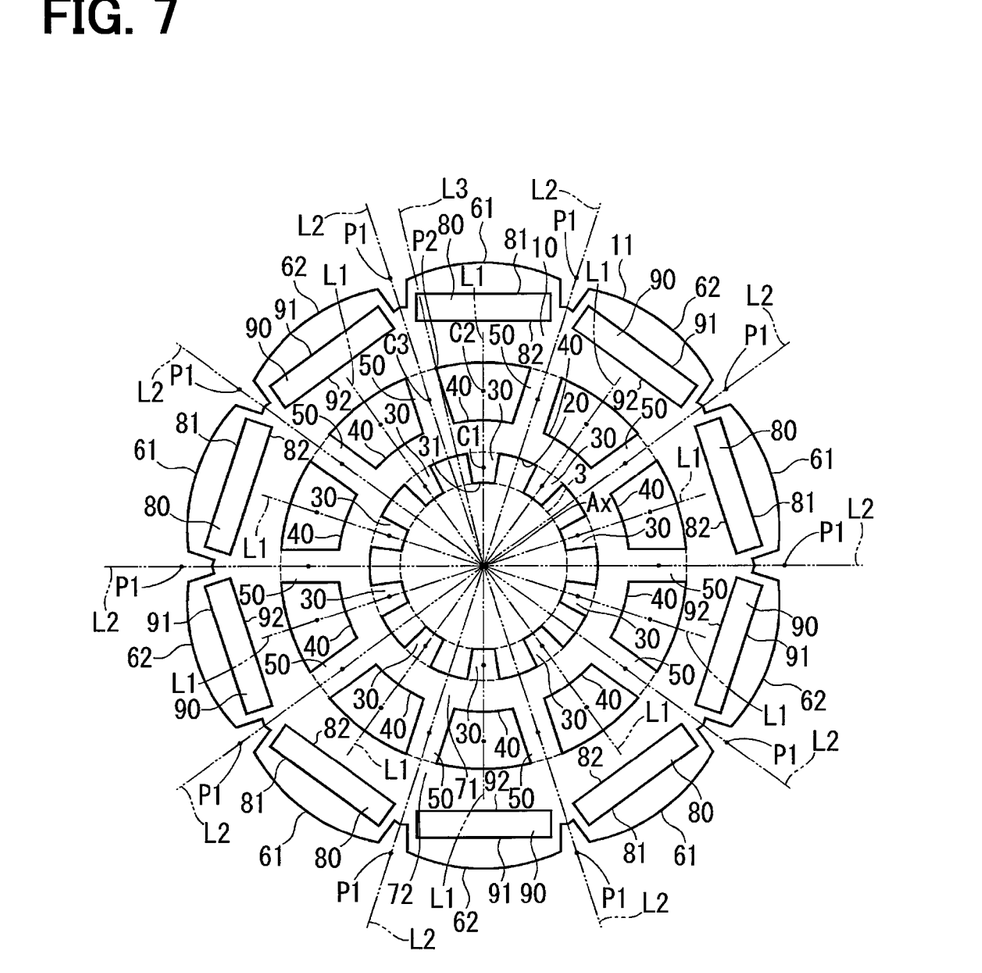
FIG. 7 is a schematic view illustrating a rotor according to a sixth embodiment.

A rotor according to a sixth embodiment is shown in FIG. 7. The sixth embodiment differs in the shape and the arrangement of the magnets from the third embodiment.

In the sixth embodiment, the first surface 81 and the second surface 82 of the magnet 80 are formed plane and flat, and the first surface 91 and the second surface 92 of the magnet 90 are formed plane and flat. Compared with the third embodiment, the volume of the magnet 80, 90 is smaller in the sixth embodiment.

The magnet 80 is formed to be located inside the pole part 61. The magnet 90 is formed to be located inside the pole part 62. That is, the magnets 80 and 90 are formed on the radially inner side of the outer wall 11 which is the radially outer end of the core main part 10. In other words, the magnets 80 and 90 are embedded inside of the core main part 10. Thus, the rotor of this embodiment is a rotor used for the IPM type rotary electric machine.

The other configuration in this embodiment is the same as that of the third embodiment. Therefore, the similar advantages can be achieved in this embodiment as the third embodiment.

Moreover, since the magnet 80, 90 is embedded inside of the core main part 10, the mechanical strength is high. The magnet 80, 90 is prevented from slipping off from the core main part 10, so the rotor of this embodiment is suitably used for high velocity rotation. Moreover, compared with the SPM type machine shown in the third embodiment, the amount (volume) of the magnets can be reduced and the cost can be reduced.

(Other Embodiment)

The projection part may be formed so that the first imaginary straight line passes through an area except the center of the opening part as long as the first imaginary straight line passes through the opening part.

In the third and sixth embodiments, the rib part is formed so that the third imaginary straight line passes through the magnet. Alternatively, the rib part may be formed so that the third imaginary straight line passes through an area between the magnets adjacent with each other in the circumferential direction of a core main part. That is, in the third and sixth embodiments, the width dimension of the magnet or the rib part may be made smaller in the circumferential direction so that the third imaginary straight line does not pass through the magnet.

The number of the magnets may be different from the number of the projection parts and the opening parts.

The number of the projection parts, the opening parts, and the rib parts is not limited to five or ten. The number of the pole parts is not limited to ten.

In the first and second embodiments, the magnet is fixed to the core main part with adhesive. Alternatively, a cylindrical component may be disposed on the radially outer side of the core main part, for example, so that the magnet is hold between the core main part and the cylindrical component. In this case, it is not necessary to prepare the adhesive.

The core main part may be manufactured by casting, cutting, pressing, without being limited to be made of the thin boards layered with each other.

The rotary electric machine including the rotor of the present disclosure can be used as a drive source of the other equipment other than the electric power-steering equipment.

Such changes and modifications are to be understood as being within the scope of the present disclosure as defined by the appended claims.

What is claimed is:

1. A rotor for a rotary electric machine, the rotor comprising:
   a core main part having a central axis;
   a central hole part passing through the core main part along the central axis;
   a projection part projected from an inner wall of the central hole part toward the central axis and arranged in a circumferential direction with an equal interval;
   an opening part passing through the core main part in a direction parallel to the central axis and being arranged in the circumferential direction with an equal interval;
   a rib part defined between two of the opening parts adjacent with each other in the circumferential direction;
   a pole part formed on a radially outer wall of the core main part and arranged in the circumferential direction with an equal interval;
   a first annular part having a ring shape defined between the central hole part and the opening part in a radial direction;
   a second annular part having a ring shape defined between the opening part and the pole part in the radial direction; and
   a magnet disposed at a position corresponding to the pole part, wherein
   a first imaginary straight line is defined to extend outward in the radial direction from the central axis through a center of the projection part in the circumferential direction,
   a second imaginary straight line is defined to extend outward in the radial direction from the central axis through a center of the rib part in the circumferential direction,
   the projection part is formed so that the first imaginary straight line passes the opening part,
   the rib part is formed so that the second imaginary straight line passes a center of the pole part;
   the rib part is one of a plurality of rib parts;
   the projection part is one of a plurality of projection parts; and
   the plurality of rib parts and the plurality of projection parts are alternately arranged in the circumference direction, and do not overlap with each other in the radial direction.

2. The rotor according to claim 1, wherein
   the projection part is formed so that the first imaginary straight line passes a center of the opening part in the circumferential direction.

3. The rotor according to claim 1, wherein
   the number of the magnets is the same as the number of the projection parts, and
   the number of the magnets is the same as the number of the opening parts.

4. The rotor according to claim 1, wherein
   the number of the magnets is half of the number of the pole parts.

5. The rotor according to claim 1, wherein
   the number of the magnets is the same as the number of the pole parts.

6. The rotor according to claim 1, wherein
   the magnet has an outer wall, and a part of the outer wall of the magnet is exposed at the pole part.

7. The rotor according to claim 1, wherein the magnet is positioned on an inner side of the pole part in the radial direction.

8. A rotary electric machine comprising the rotor according to claim 1, the rotary electric machine further comprising:
   a shaft integrally rotating with the rotor, the shaft being press-fitted inside the central hole part so that an outer wall of the shaft is in contact with a tip end of the projection part; and
   a stator disposed on an outer side of the rotor in the radial direction to generate a rotating magnetic field by being energized.

\* \* \* \* \*